United States Patent
Brummerstedt Iversen et al.

(10) Patent No.: US 9,963,609 B2
(45) Date of Patent: May 8, 2018

(54) PRODUCTION OF TITANIA NANOPARTICLE COLLOIDAL SUSPENSIONS WITH MAINTAINED CRYSTALLINITY BY USING A BEAD MILL WITH MICROMETER SIZED BEADS

(75) Inventors: Steen Brummerstedt Iversen, Vedbæk (DK); Hans Rasmussen, Valsø (DK); Christian Ausig Christensen, Frederiksberg (DK); Henrik Jensen, Ølstykke (DK); Theis Reenberg, København N (DK)

(73) Assignee: VALINGE PHOTOCATALYTIC AB, Viken (SE)

( * ) Notice: Subject to any disclaimer, the term of this patent is extended or adjusted under 35 U.S.C. 154(b) by 959 days.

(21) Appl. No.: 13/203,763

(22) PCT Filed: Mar. 22, 2010

(86) PCT No.: PCT/SE2010/050312
§ 371 (c)(1),
(2), (4) Date: Nov. 1, 2011

(87) PCT Pub. No.: WO2010/110726
PCT Pub. Date: Sep. 30, 2010

(65) Prior Publication Data
US 2012/0064787 A1    Mar. 15, 2012

(30) Foreign Application Priority Data
Mar. 23, 2009    (DK) .................................. 2009 00401

(51) Int. Cl.
*C09D 17/00*    (2006.01)
*B82Y 30/00*    (2011.01)
(Continued)

(52) U.S. Cl.
CPC ............ *C09D 17/008* (2013.01); *B82Y 30/00* (2013.01); *C01G 23/047* (2013.01);
(Continued)

(58) Field of Classification Search
CPC . C01G 23/047; A61C 17/043; A61C 17/0211; A61M 16/0488; A61M 1/0084;
(Continued)

(56) References Cited

U.S. PATENT DOCUMENTS 3,798,111 A    3/1974 Lane et al.
3,932,342 A    1/1976 Nagata et al.
(Continued)

FOREIGN PATENT DOCUMENTS

BE    1015862 A6    10/2005
BE    1017168 A5    3/2008
(Continued)

OTHER PUBLICATIONS

Inkyo et al, "Beads Mill-Assisted Synthesis of Poly Methyl Methaerylate (PMMA)-Ti02 Nanoparticle Composites", Ind. Eng, Chem. Res. (2008), 47, pp. 2597-2604.*
(Continued)

*Primary Examiner* — Daniel S Metzmaier
(74) *Attorney, Agent, or Firm* — Buchanan Ingersoll & Rooney P.C.

(57) ABSTRACT

A method is disclosed of producing stable nanosized colloidal suspensions of particles with limited crystallinity loss, products thereof, use of the products and an apparatus for the method. In particular the present invention relates to a wet milling method with small beads wherein the size of the final particles in suspension are stabilized in the nanorange (D50<75 nm) and at the same time the particles substantially maintain the crystallinity.

18 Claims, 3 Drawing Sheets

(51) Int. Cl.
  *C01G 23/047* (2006.01)
  *C03C 17/25* (2006.01)
  *C09C 1/36* (2006.01)
  *C09D 1/00* (2006.01)

(52) U.S. Cl.
  CPC .......... *C03C 17/256* (2013.01); *C09C 1/3607* (2013.01); *C09C 1/3623* (2013.01); *C09D 1/00* (2013.01); *C01P 2002/52* (2013.01); *C01P 2004/64* (2013.01); *C03C 2217/212* (2013.01); *C03C 2217/24* (2013.01); *C03C 2217/71* (2013.01); *C03C 2218/11* (2013.01); *Y10T 428/31678* (2015.04); *Y10T 428/31989* (2015.04); *Y10T 442/2352* (2015.04)

(58) Field of Classification Search
  CPC ............ A61M 16/0493; A61M 1/0023; A61M 16/049; A61M 1/0025; A61M 16/0495; A61M 1/0058; A61M 2210/065; A61M 2210/0643; A61M 2210/0625; A61F 5/566; C09D 17/008; C09D 1/00; C09C 1/3623; C09C 1/3607; C03C 17/256; C03C 2217/24; C03C 2217/212; C03C 2217/71; C03C 2218/11; C01P 2004/64; C01P 2002/52; Y10T 428/31989; Y10T 442/2352; Y10T 428/31678
  See application file for complete search history.

(56) References Cited

U.S. PATENT DOCUMENTS

| | | | |
|---|---|---|---|
| 5,439,514 A * | 8/1995 | Kashiwazaki et al. .... | 106/31.65 |
| 5,679,138 A * | 10/1997 | Bishop et al. ............. | 106/31.75 |
| 5,714,269 A | 2/1998 | Muñoz Madrid | |
| 5,853,830 A * | 12/1998 | McCaulley et al. ......... | 428/35.7 |
| 5,882,246 A * | 3/1999 | Inkyo et al. .................... | 451/87 |
| 6,162,842 A | 12/2000 | Freche | |
| 6,228,480 B1 | 5/2001 | Kimura et al. | |
| 6,284,314 B1 | 9/2001 | Kato et al. | |
| 6,299,981 B1 * | 10/2001 | Azzopardi et al. ........... | 428/429 |
| 6,409,821 B1 | 6/2002 | Cassar et al. | |
| 6,436,159 B1 | 8/2002 | Safta et al. | |
| 6,666,913 B2 * | 12/2003 | Hirano et al. ................ | 106/31.9 |
| 6,740,312 B2 | 5/2004 | Chopin et al. | |
| 6,835,421 B1 | 12/2004 | Döhring | |
| 8,568,870 B2 | 10/2013 | Imai et al. | |
| 8,652,646 B2 | 2/2014 | Heukelbach et al. | |
| 9,375,750 B2 | 6/2016 | Reenberg et al. | |
| 9,573,126 B2 | 2/2017 | Humle et al. | |
| 2002/0005145 A1 | 1/2002 | Sherman | |
| 2002/0006425 A1 | 1/2002 | Takaoka et al. | |
| 2002/0042343 A1 | 4/2002 | Akui et al. | |
| 2002/0108640 A1 | 8/2002 | Barger et al. | |
| 2003/0162658 A1 * | 8/2003 | Domen et al. ................. | 502/340 |
| 2003/0236317 A1 * | 12/2003 | Sakatani et al. ................ | 522/66 |
| 2004/0067703 A1 | 4/2004 | Grunden et al. | |
| 2004/0081818 A1 | 4/2004 | Baumann et al. | |
| 2004/0197682 A1 | 10/2004 | Sonehara et al. | |
| 2004/0251329 A1 | 12/2004 | Hsu et al. | |
| 2004/0253172 A1 * | 12/2004 | Jung et al. ..................... | 423/598 |
| 2005/0069706 A1 | 3/2005 | Kessell | |
| 2005/0145939 A1 | 7/2005 | Okada et al. | |
| 2005/0191505 A1 | 9/2005 | Akarsu et al. | |
| 2005/0233893 A1 * | 10/2005 | Sakatani et al. ............. | 502/150 |
| 2006/0003013 A1 | 1/2006 | Dobbs | |
| 2006/0014050 A1 | 1/2006 | Gueneau et al. | |
| 2007/0140951 A1 * | 6/2007 | O'Brien .................. | A61K 8/19 |
| | | | 423/592.1 |
| 2007/0272382 A1 | 11/2007 | Becker et al. | |
| 2008/0032120 A1 | 2/2008 | Braun | |
| 2008/0044483 A1 | 2/2008 | Kessell | |
| 2008/0260626 A1 | 10/2008 | Bloss et al. | |
| 2009/0025508 A1 | 1/2009 | Liao et al. | |
| 2009/0075093 A1 * | 3/2009 | Iversen .................. | C03C 17/006 |
| | | | 428/432 |
| 2009/0136861 A1 * | 5/2009 | Mitsumori et al. ............. | 430/66 |
| 2009/0142604 A1 | 6/2009 | Imai et al. | |
| 2009/0180976 A1 | 7/2009 | Seeney et al. | |
| 2009/0191273 A1 | 7/2009 | Kessell et al. | |
| 2009/0208646 A1 | 8/2009 | Kreuder et al. | |
| 2009/0286068 A1 | 11/2009 | Niguma et al. | |
| 2009/0317624 A1 | 12/2009 | Yoshioka et al. | |
| 2010/0031450 A1 | 2/2010 | Wattebled et al. | |
| 2010/0058954 A1 | 3/2010 | Kisch | |
| 2010/0112359 A1 | 5/2010 | Sharma et al. | |
| 2010/0113254 A1 | 5/2010 | Sato et al. | |
| 2010/0203308 A1 | 8/2010 | Mennig et al. | |
| 2010/0297434 A1 | 11/2010 | Iversen et al. | |
| 2011/0083726 A1 | 4/2011 | Takayanagi | |
| 2011/0095242 A1 | 4/2011 | Jin et al. | |
| 2011/0123814 A1 | 5/2011 | Heukelbach et al. | |
| 2011/0136660 A1 | 6/2011 | Terasaki et al. | |
| 2011/0136928 A1 | 6/2011 | Dipietro et al. | |
| 2011/0189471 A1 | 8/2011 | Ziegler et al. | |
| 2013/0011684 A1 | 1/2013 | Jensen et al. | |
| 2014/0178694 A1 | 6/2014 | Reenberg et al. | |
| 2015/0083319 A1 * | 3/2015 | Persson et al. ................ | 156/279 |
| 2015/0102258 A1 | 4/2015 | Humle et al. | |
| 2015/0343486 A1 | 12/2015 | Jensen et al. | |
| 2016/0075606 A1 | 3/2016 | Jensen et al. | |

FOREIGN PATENT DOCUMENTS

| | | | |
|---|---|---|---|
| CN | 1445312 A | | 10/2003 |
| CN | 1662465 A | | 8/2005 |
| DE | 10 2004 032 0 | | 5/2005 |
| DE | 10 2007 054 848 A1 | | 5/2009 |
| EP | 0 684 507 A2 | | 11/1995 |
| EP | 0 684 507 A3 | | 11/1995 |
| EP | 0 913 447 A1 | | 5/1999 |
| EP | 0 684 507 B1 | | 9/1999 |
| EP | 0 947 469 A2 | | 10/1999 |
| EP | 1 371 693 A2 | | 12/2003 |
| EP | 1 541 231 A1 | | 6/2005 |
| EP | 1 541 638 A1 | | 6/2005 |
| EP | 1 577 009 A1 | | 9/2005 |
| EP | 1 760 116 A1 | | 3/2007 |
| EP | 1 997 860 A1 * | | 12/2008 |
| FR | 2 789 591 A1 | | 8/2000 |
| JP | 2002-011827 A | | 1/2002 |
| JP | 2002-146283 A | | 5/2002 |
| JP | 2002-177792 A | | 6/2002 |
| JP | 2002249705 A * | | 9/2002 |
| JP | 2003/071967 A | | 3/2003 |
| JP | 2005-281017 A | | 10/2005 |
| JP | 2007176753 A * | | 7/2007 |
| JP | 2008/261093 A | | 10/2008 |
| WO | WO 96/39251 A1 | | 12/1996 |
| WO | WO 97/00134 A1 | | 1/1997 |
| WO | WO 97/30130 A1 | | 8/1997 |
| WO | WO 98/23549 A1 | | 6/1998 |
| WO | WO 00/44984 A1 | | 8/2000 |
| WO | WO 02/08518 A1 | | 1/2002 |
| WO | WO 02/064266 A2 | | 8/2002 |
| WO | WO 03/016219 A1 | | 2/2003 |
| WO | WO 03/087002 A1 | | 10/2003 |
| WO | WO 2004/005577 A2 | | 1/2004 |
| WO | WO 2004/069400 A1 | | 8/2004 |
| WO | WO 2005/045131 A1 | | 5/2005 |
| WO | WO 2005/066286 A1 | | 7/2005 |
| WO | WO 2005/068181 A1 | | 7/2005 |
| WO | WO 2005/116361 A1 | | 12/2005 |
| WO | WO 2006/136931 | * | 12/2006 |
| WO | WO 2007/015669 A2 | | 2/2007 |
| WO | WO 2007/015669 A3 | | 2/2007 |
| WO | WO 2007/069596 A1 | | 6/2007 |
| WO | WO 2007/072008 A2 | | 6/2007 |
| WO | WO 2007/097284 A1 | | 8/2007 |
| WO | WO 2007/135987 A1 | | 11/2007 |
| WO | WO 2007/144718 A2 | | 12/2007 |
| WO | WO 2007/144718 A3 | | 12/2007 |
| WO | WO 2008/040730 A1 | | 4/2008 |

(56) References Cited

FOREIGN PATENT DOCUMENTS

| | | |
|---|---|---|
| WO | WO 2008/117655 A1 | 10/2008 |
| WO | WO 2008/128818 A1 | 10/2008 |
| WO | WO 2009/021524 A1 * | 2/2009 |
| WO | WO 2009/024285 A1 | 2/2009 |
| WO | WO 2009/062516 A2 | 5/2009 |
| WO | WO 2009/062516 A3 | 5/2009 |
| WO | WO 2009/065769 A2 | 5/2009 |
| WO | WO 2009/065769 A3 | 5/2009 |
| WO | WO 2009/124704 A1 | 10/2009 |
| WO | WO 2009/145209 A1 | 12/2009 |
| WO | WO 2009/157449 A1 | 12/2009 |
| WO | WO 2010/001669 A1 | 1/2010 |
| WO | WO 2010/037866 A1 | 4/2010 |
| WO | WO 2010/110726 A1 | 9/2010 |
| WO | WO 2011/075837 A1 | 6/2011 |
| WO | WO 2011/093785 A1 | 8/2011 |

OTHER PUBLICATIONS

Inkyo et al, "Experimental investigation of nanoparticle dispersion by beads milling with centrifugal bead separation", Journal of Colloid and Interface Science, 304 (2006) pp. 535-540.*

Espacenet Machine Translation of JP 2007176753 A, Jul. 12, 2007 (Sumitomo Osaka Cement Co Ltd), pp. 1-16 (online @ http://worldwide.espacenet.com/?locale=EN_ep).*

Machine Translation of Publ. No. JP 2002-249705 A, published Dec. 2008, Japan patent Office, Tokyo, Japan, obtained online @ http://dossier1.ipdl.inpit.go.jp/AIPN/odse_top_dn.ipdl?N0000=7400 (Downloaded Dec. 8, 2016) pp. 1-12.*

Jang, Hee Dong, et al., "Effect of particle size and phase composition of titanium dioxide nanoparticles on the photocatalytic properties," Journal of Nanoparticle Research, Jan. 1, 2001, pp. 141-147, vol. 3, Kluwer Academic Publishers, NL.

Caseri, Walter, "Nanocomposites of polymers and metals or semiconductors: Historical background and optical properties," Macromol. Rapid Commun., Jan. 1, 2000, pp. 705-722, vol. 21, No. 11, Wiley-VCH Verlag GmbH, Weinheim, DE.

Mandzy, N., et al., "Breakage of $TiO_2$ agglomerates in electrostatically stabilized aqueous dispersions," Powder Technology, Dec. 6, 2005, pp. 121-126, vol. 160, No. 2, Elsevier Sequoia, Lausanne, CH.

Humle, Michael, et al., U.S. Appl. No. 14/386,063, entitled "A Photocatalytic Composition," filed Sep. 18, 2014.

Wu, Shu-Xin, et al., "XPS Study of Copper Doping $TiO_2$ Photocatalyst," Acta. Phys.—Chim. Sin., Oct. 2003, pp. 967-969, vol. 19(10), CN.

Reenberg, Theis, et al., U.S. Appl. No. 61/504,558, entitled "Coated Wood Products and Method of Producing Coated Wood Products," filed Jul. 5, 2011.

International Search Report (PCT/ISA/210) dated Jul. 5, 2010, by Swedish Patent Office as the International Searching Authority for International Application No. PCT/SE2010/050312.

Written Opinion (PCT/ISA/237) dated Jul. 5, 2010, by Swedish Patent Office as the International Searching Authority for International Application No. PCT/SE2010/050312.

Ingkyo, Mitsugi, et al., "Beads Mill-Assisted Synthesis of Poly Methyl Methacrylate (PMMA)-$TiO_2$ Nanoparticle Composites," Ind. Eng. Chem. Res., 2008, pp. 2597-2604, vol. 47, No. 8, American Chemical Society, USA (published on the web Mar. 14, 2008).

Ingkyo, Mitsugi, et al., "Experimental investigation of nanoparticle dispersion by beads milling with centrifugal bead separation," Journal of Colloid and Interface Science, 2006, pp. 535-540, vol. 304, Elsevier Inc., USA.

Joni, I Made, et al., "Dispersion Stability Enhancement of Titania Nanoparticles in Organic Solvent Using a Bead Mill Process," Ind. Eng. Chem. Res., 2009, pp. 6916-6922, vol. 48, No. 15, American Chemical Society, USA (published on the web Jul. 13, 2009).

Takeda, Masayoshi, et al., "High-concentration Transparent $TiO_2$ Nanocomposite Films Prepared from $TiO_2$ Nanoslurry Dispersed by Using Bead Mill," Polymer Journal, 2008, pp. 694-699, vol. 40, No. 8, the Society of Polymer Science, JP.

Takeda, Masayoshi, et al., "Preparation of Nanocomposite Microspheres Containing High Concentration of $TiO_2$ Nanoparticles via Bead Mill Dispersion in Organic Solvent," Chemistry Letters, 2009, pp. 448-449, vol. 38, No. 5, The Chemical Society of Japan, JP.

Thompson, Tracy L., et al., "Surface Science Studies of the Photoactivation of $TiO_2$-New Photochemical Processes," Chem. Rev., 2006, pp. 4428-4453, vol. 106, No. 10, American Chemical Society, USA (published on the web Oct. 11, 2006).

Uzunova-Bujnova, M., et al., "Effect of the mechanoactivation on the structure, sorption and photocatalytic properties of titanium dioxide," Materials Chemistry and Physics, 2008, pp. 291-298, vol. 110, Elsevier B.V., The Netherlands.

Parker, John, "Next-generation abrasive particles for CMP", Solid Technology, Dec. 2004, pp. 30-31.

Jensen, Henrik, et al, "Characterization of nanosized partly crystalline photocatalysts", Journal of Nanoparticle Research 6, 2004, pp. 519-526.

"Information Sheet—Cleaning and maintenance of laminate flooring in commercial areas created on behalf of the EPLF," Sep. 22, 1999, 5 pages, European Producers of Laminate Flooring, Bielefeld, DE.

Mills, A., et al., "An intelligence ink for photocatalytic films," Chem. Commun., published as an Advance Article on the web Apr. 14, 2005, pp. 2721-2723, The Royal Society of Chemistry, www.rsc.org.chemcomm.

Extended European Search Report issued in European Patent Application No. 10756423.9, dated Jul. 20, 2012, 7 pages, European Patent Office, Rijswijk, NL.

Kim, Seong-Jim, et al., "Aqueous $TiO_2$ suspension preparation and novel application of ink-jet printing technique for ceramics patterning," Journal of Materials Science Letters, 1998, pp. 141-144, vol. 17, Chapman & Hall, London, England.

Schmidt, Helmut K., et al., "Application of spray techniques for new photocatalytic gradient coatings on plastics," Thin solid films, Apr. 28, 2006, vol. 502, Issues 1-2, pp. 132-137, Elsevier B.V., NL.

Thilagan Palaniandy, Samayamutthirian, "A Study on Ultra Fine Grinding of Silica and Talc in Opposed Fluidized Bed Jet Mill," PhD Thesis, 2008, 48 pages, Universiti Sains Malaysia, http://eprints.usm.my/view/creators/Thilagan_Palaniandy=3ASamayamutthirian=3A=3A.html.

Communication Pursuant to Article 94(3) EPC (EPO Form 2001 12.10CSX and EPO Form 2906 01.91 TRI) issued in EP 08 848 938.0, dated Oct. 20, 2011, 7 pages, European Patent Office, Munich, DE.

Nussbaumer, Rene J., et al., "Synthesis and characterization of surface-modified rutile nanoparticles and transparent polymer composites thereof," Journal of Nanoparticle Research, Aug. 1, 2002, pp. 319-323, vol. 4, No. 4, Kluwer Academic Publishers, Dordrecht, NL.

"Transparent Pigments," Kirk-Othmer Encyclopedia of Chemical Technology, Fourth Edition, 1996, vol. 19, pp. 36-37, John Wiley & Sons, Inc., NY, US.

Communication Pursuant to Article 94(3) EPC issued in EP 14 157 659.5, dated Feb. 4, 2016, European Patent Office, Rijswijk, NL, 6 pages.

Ziegler, Göran, et al., U.S. Appl. No. 15/394,874 entitled "Method for Applying Nanoparticles," filed Dec. 30, 2016.

* cited by examiner

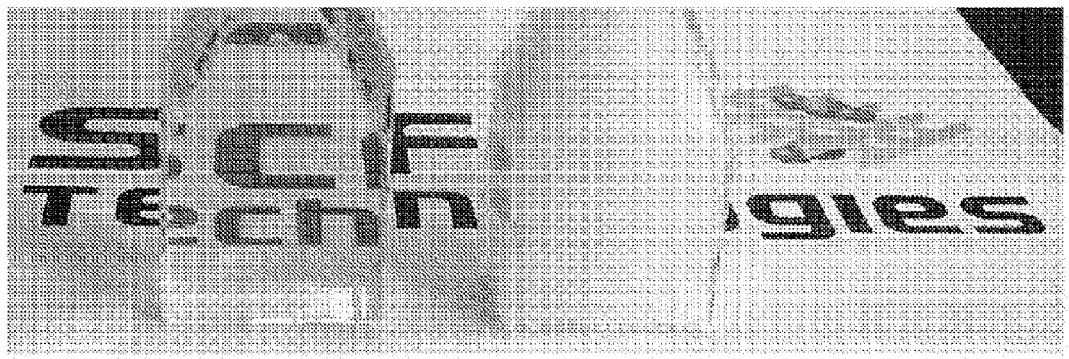
Fig. 3
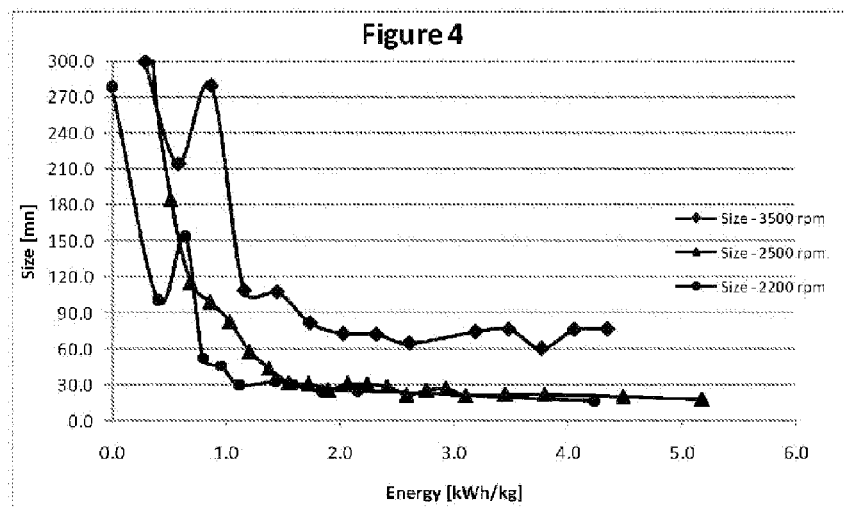
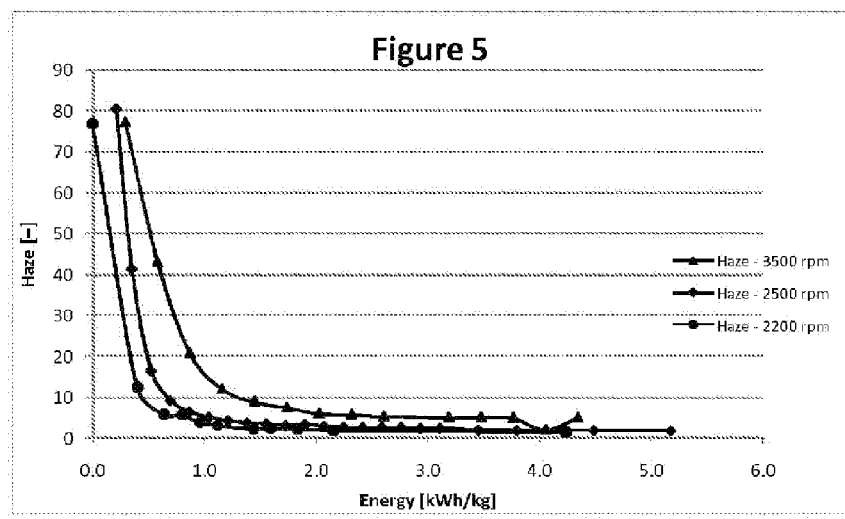

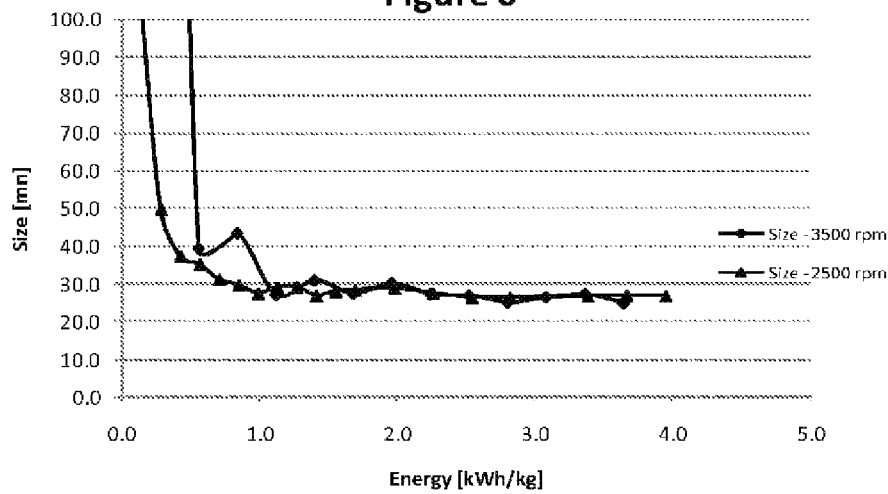
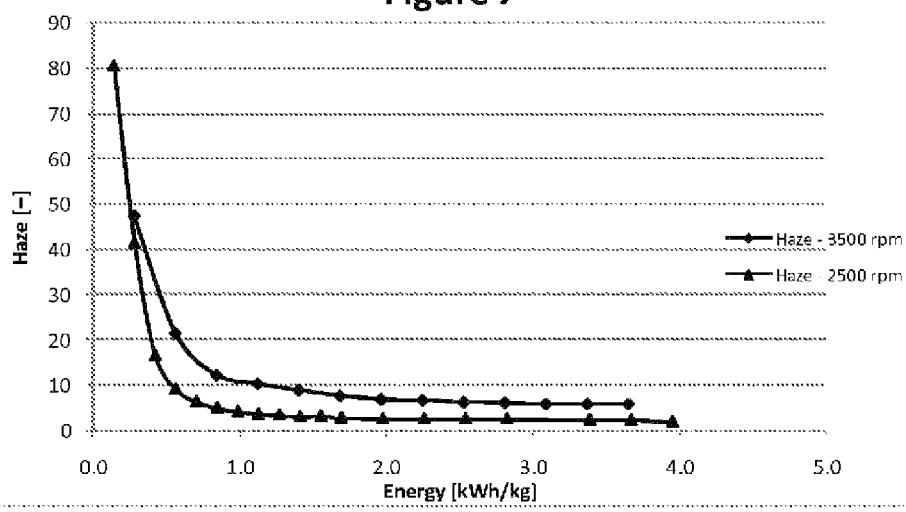

PRODUCTION OF TITANIA NANOPARTICLE COLLOIDAL SUSPENSIONS WITH MAINTAINED CRYSTALLINITY BY USING A BEAD MILL WITH MICROMETER SIZED BEADS

The present invention relates to a method of producing stable nanosized colloidal suspensions of particles with limited crystallinity loss and products thereof. In particular the present invention relates to a wet milling method with small beads wherein the size of the final particles in suspension are stabilized in the nanorange (D50<75 nm) and at the same time the particles substantially maintain the crystallinity.

BACKGROUND

Dispersion of powders into various solvents is an important discipline for numerous industrial applications ranging from paints to cosmetics. It is well known in nanotechnology that very small nano-materials have properties which significantly differ from their bulk counterpart. For nano particles a large fraction of the particles consist of surface atoms which lead to very high surface area per mass. Suspensions of powders of nano-crystalline materials in solvents, wherein the size of the particle agglomerates in the suspension are in the nano-regime are attracting a lot of attention due to the increased functionality provided. A number of factors determine the functionality of the materials including chemical composition, crystal form and crystallinity, size of crystallites and size of particles in suspension. Examples of size dependent properties are optical transparency, hardness, thermal and electrical conductivity, chemical reactivity and catalytic and electronic properties.

Various techniques have been developed for dispersing powders into different solvents including high shear rate mixing, sonication, milling and/or grinding techniques. One often encountered problem is that such techniques lead to colloidal suspensions, which are hazy and/or milky due to a relatively large particle size in suspension. When applied e.g. as a coating to the surface of a substrate, the haze of the coating fluid is maintained in the coating, which is undesirable in many applications. Further the relatively large size of the particle agglomerates or clusters in such coatings and/or colloidal suspensions may result in a reduced or non-optimal functionality.

Some descriptions of fine grinding by the use of small beads to obtain submicron dispersions are present in e.g. [Dobbs (US 2006/0003013 A1) and Hsu et al (US 2004/0251329 A1)]. Fine grinding is normally carried out in energy intensive grinding mills such as planetary mill, attrition mill, oscillating mill, ball mill, bead mill, and jet mill. These mills deliver huge amount of energy for particle breakage to produce particles below 10 μm. Besides size reduction these energy intensive grinding mills mill also induce structural changes near surface region where the solids come into contact under mechanical forces besides size reduction. The structural changes induces changes in crystallinity, crystallite size and lattice strain. [THILAGAN PALANIANDY 2008].

Although it is possible by fine grinding to obtain submicron dispersion certain application needs crystalline particles. For example the use of $TiO_2$ in photocatalytic applications the activity is directly related to the crystallinity of the $TiO_2$ particles [Jensen et al. 2004] and therefore it is very important to control and maintain the initial crystallinity. The structural changes and the crystallinity loss can't be avoided during fine grinding process as it happens concurrently with the size reduction process [THILAGAN PALANIANDY 2008].

The present invention differs from Dobbs and Hsu et al. as they don't take in to consideration the fact that high intensity milling induces structural changes (e.g. crystallinity loss) concurrently with the size reduction process.

The present inventors have also found that even with excessive processing time of such conventional techniques for producing colloidal suspensions, the particle size may not change further. It has further been found that even at conditions and for formulations, where it is possible to obtain a clear colloidal suspension, a significant loss of crystallinity may result, thereby hampering the functionality of the particles in suspension.

Thus, an objective of the present invention is to mitigate the problems of obtaining a more stable and optically clear colloidal suspension of a nano-crystalline particles in a solvent than in the prior art.

It is further an objective to provide a method, which allows for production of colloidal suspensions of nano-crystalline powders in a solvent, which are faster and/or more efficient and/or result in a smaller particle size in said colloidal suspension and/or maintain a higher crystallinity of said particles in said colloidal suspension and/or have a higher functionality than in the prior art.

One of the objectives of the present invention is to control the crystallinity of the nanoparticles without loosing the stability during the production of nanoparticles suspensions.

Still another objective of the present invention is to provide stable and optically clear colloidal suspension products suitable for making clear coatings with improved functionality.

SUMMARY OF THE INVENTION

In accordance with an object of the present invention a method for producing a stable and optically clear colloidal suspension of a nano-crystalline powder in a solvent is devised.

It has been found that such a stable colloidal suspension of small sized particles with limited loss of crystallinity and thereby increased functionality can be produced by
  providing a mixture by mixing said nano-crystalline particles with a solvent and one or more dispersants,
  producing a colloidal suspension of said nano-crystalline particles by subjecting the mixture to a milling process in a milling chamber, wherein said mixture is contacted with milling beads,
  separating said beads from said colloidal suspension.
The method preferably involves
  using said milling beads in said milling process having an average diameter of maximum 70 μm such as maximum 50 μm and preferably maximum 40 μm such as maximum 30 μm, and even more preferable an average diameter of maximum 20 μm such as maximum 10 μm
  milling said particles in said suspension until the particles in suspension have an average size of less than 60 nm such as less than 50 nm and preferably less than 40 nm such as less than 30 nm and even more preferably less than 20 nm, while at least 50% of the initial crystallinity of said primary particles is being maintained after said milling such as at least 60% of the initial crystallinity of said primary particles is being maintained after said milling, and preferably at least 70% of the initial crystallinity of said primary particles is being maintained after said milling such as at least 80% of the initial crystallinity being maintained after said milling, and even more preferably at least 90% of the initial crystallinity of said primary particles is being maintained after said milling.

The crystallinity of the processed particles is preferably maintained during the milling process by controlling that the induced energy (energy transferred to a particle to be milled by the bead during one event) is less than the amorphization energy. In a preferred embodiment of the present invention small beads (<75 µm) and a mild and controlled milling procedure is used to obtain substantially the same crystallinity of the processed particles as the initial crystallinity. By a mild and controlled milling procedure is preferably meant a process where the induced energy is substantially controlled to be lower than the amorphization energy in order to substantially avoid crystalline to amorphous phase transitions of the nano-particles.

It has been surprisingly found in connection with the present invention that a stable suspension with nanosized particles (D50<50 nm) with a dry matter content of more than 10 wt %, preferably more than 20 wt %, even more preferably more than 25 wt % and a crystallinity loss less than 10% is obtainable by controlling that the induced energy ($E_{kin}$) so as to be higher than the de-aggregation energy ($E_{de\text{-}aggr}$) but less than the amorphization energy ($E_{amorphous}$) i.e. $E_{amorphous} > E_{kin} > E_{de\text{-}aggr}$.

The induced energy ($E_{kin}$), which also can be denoted the stress energy of the grinding media, is a function of the properties of the beads (size and density) and the velocity of the beads. The induced energy as a function of the properties of the beads can in general terms be expressed as $E_{kin} \propto d^3_{beads} \cdot \rho_{beads} \cdot v^2_{beads}$, where $d_{beads}$ is the diameter of the beads, $\rho_{beads}$ is the density of the beads, and $v_{beads}$ is the velocity of the beads. Thus to be able to de-aggregate particles $E_{kin}$ has to be larger than or equal to $E_{de\text{-}aggr}$.

The induced energy is controlled by adjusting the milling parameters bead size, and/or bead density, and/or bead velocity. Accordingly, the milling process according to the present invention may involve selection of these milling parameters so as to obtain an induced energy which is below the amorphization energy. While these parameters may be obtained by calculation it may be more efficient to empirically establish the optimum parameters.

According to the invention the induced energy should preferably be kept low by keeping the beadsize low, since the use of large beads (large $d_{bead}$) even at very low bead velocities (small $v_{bead}$) may lead to amorphization.

Ideally $E_{kin}$ is equal to the energy necessary to de-aggregate particles by one collision or stress event and in general terms it can be expressed as $E_{de\text{-}aggr.} \propto N_{events} \cdot E_{kin}$, where the de-aggregation energy is proportional to the induced energy times the number of stress events. To control and substantially maintain the crystallinity of the processed particles $E_{kin}$ needs to be smaller than the energy needed to transform crystalline particles to amorphous material, $E_{amorphous}$.

It is therefore important not only to control the total amount of energy induced to a specific milling process in kWh/kg but what is essential to maintain the crystallinity of the processed particles is also to control the energy of each event in µJ/event.

In a further preferred embodiment the induced energy is constant during the milling process or the induced energy is increasing or decreasing or a combination of constant, decreasing and increasing induced energy as a function of process time.

Although, it may be preferred to carry out the mixing and milling as two separate and subsequent steps, the steps of mixing and milling may be carried out in a number of ways, for instance as two separate steps or as a single step. In the first instance, the mixing may be performed in a separate mixing chamber and introducing the mixture into a milling means. In the second instance, the mixture may be provided in the milling means while the milling is carried out (the milling may be seen as carrying out the mixing as well).

Furthermore, the method may be embodied as a batch process and or a continuous process. In the batch process, a batch of mixture is milled whereafter the beads are separated off. In the continuous case, the mixture is continuously produced and continuously milled.

The method is extremely fast and mild, and allows for dispersion in a single step. The milling beads used in said milling process preferably have a narrow size distribution according to the present invention. The duration of said method is often less than 5 hours such as a duration of less than 3 hours, and preferably the duration is less than 2 hours such as a duration of less than 1 hour, and more preferably a duration of less than 30 minutes.

In the present context a number of terms are used in a manner being ordinary to a skilled person. However, some indications on the meaning of some of the terms are presented below:

Wet Milling: A grinding process in which the solid material to be ground is mixed with liquid.

Suspension: Consist of a continuous phase, which is a liquid, and a disperse phase, which is formed from solid particles.

Stability of suspension: The stability of the suspension is defined by the sedimentation rate of solid particles in the suspension. The more the suspension substantially maintain its physical properties (e.g. particle size and dry matter content) as a function of time the more stable the suspension is.

Amorphization: The conversion of a crystalline material into an amorphous one.

Mild milling procedure: By a mild milling procedure is preferably meant a process where the induced energy is controlled to be lower than the amorphization energy in order to substantially avoid crystalline to amorphous phase transitions.

Particles generally consist of several primary particles or grains, which may be agglomerated or clustered together. The primary particles may be more or less crystalline. In the limit primary particles and particles may be the same. A nano-crystalline material in the present context is preferably used to mean a material with primary particle size in the nano regime (less than 100 nm, such as less than 80 nm, preferably less 50 nm, even preferably less than 20 nm, such as less than 10 nm), which is crystalline i.e. the primary particles are nano-crystallites. A material is crystalline if it has long range order and thus a well defined unit cell. The opposite of crystalline is amorphous, and a given material will have certain percentage that is crystalline. In the present context crystalline means absolute crystallinity as measured against a 100% crystalline material as internal reference [H. Jensen, K. D. Jensen, J.-E. Jørgensen, J. S. Pedersen, E. G. Søgård, Journal of Nanoparticle Research 2004, 6, 519-526].

In many embodiments of the present invention a relatively high crystallinity of the particles in a colloidal suspension is preferred. Hence, the crystallinity of the particles in said colloidal suspension may have crystallinity of at least 30% such as at least 40%, and preferably a crystallinity of at least 50% such as a crystallinity of at least 60% and even more preferably a crystallinity of at least 70% such as a crystallinity of at least 80%.

The weight fraction of said nano-crystalline powder in said colloidal suspension is in many applications according to the present invention at least 10% by weight such as a weight fraction of said particles of at least 20% by weight, and preferably the weight fraction of said particles in said colloidal suspension is at least 30% by weight, such as a weight fraction of at least 40% by weight.

In a preferred embodiment of the present invention the colloidal suspension may be diluted after production e.g. by diluting it with the same solvent adjusted to the same pH as the colloidal suspension had before mixing. The colloidal suspension may be diluted to a colloidal suspension with a concentration of said nano-crystalline powder in the range 0.05 to 5% by weight, such as a 0.1 to 3% by weight, and preferably the concentration of said nano-crystalline powder in said colloidal suspension is in the range 0.3-2 wt % such as 0.4 to 1 wt %.

In such concentration levels the colloidal suspension produced according to the present invention is substantially optically clear. Hence in many embodiments of the present invention the haze of passing through 25 mm of said colloidal suspension diluted to a concentration of 0.1 wt % of said particles, have a value of less than 25, such as a haze value of less than 15 and preferably a haze value of less than 8 such as a haze value of less than 4, and even more preferably a haze value of less than 3, such as a haze per cm of suspension of less than 2, and even more preferably a haze per cm of suspension of less than 1.

In preferred embodiments of colloidal suspensions of nano-crystalline particles according to the present invention may preferably comprise agglomerates of primary particles of said nano-crystalline particles and said agglomerates having an average size of less than 60 nm such as less than 50 nm and preferably less than 40 nm such as less than 30 nm and even more preferably less than 20 nm.

Colloidal suspensions of nano-crystalline particles as disclosed herein are preferably provided by the methods according to the present invention.

The colloidal suspensions according to the present invention are often at least partly stabilized by adjusting and maintaining the pH value of said colloidal suspension in a specific range. Hence, in a preferred embodiment of the present invention the pH of the colloidal suspension is between 9 and 12, such as between 9.5 and 11.5 and preferably between 10.0 and 11.0. Said adjustment may be performed by adding a suitable base such as ammonia and/or an amine.

In a particularly preferred embodiment of the present invention said adjustment and maintaining of the pH is performed by proper selection of said one or more dispersants. It has been found that tertiary amines such as triethylamine (TEA) are particularly suitable for use as dispersants for many applications according to the present invention. Hence, in an embodiment of the present invention said one or more dispersants comprises one or more tertiary amines. Triethylamine has been found to be particularly effective for many applications of the present invention.

The concentration of said tertiary amine in said colloidal suspension is often in the range 0.1-30 wt %, such as a concentration of said tertiary amine in said colloidal suspension in the range 0.5-20 wt %, and preferably a concentration of said tertiary amine in said colloidal suspension in the range 1-10 wt %, such as a concentration of said tertiary amine in said colloidal suspension of 3-6 wt %.

It has further been found that the addition of a glycol such as monopropylene glycol as one of said one or more dispersants in said colloidal suspension is advantageous in many embodiments of the present invention. The concentration of said glycol may according to the present invention be in the range 5-40 wt % such as 5-30 wt %, and preferably the concentration of said glycol is in the range 10-20 wt % such as 15 wt %.

The solvent used for producing said colloidal suspension of a nano-crystalline powder is often water or comprises water.

An important embodiment of the present invention relates to the production of a colloidal suspension of a photocatalyst for use as a coating fluid to produce a clear photocatalytic coating of the surface on a substrate, or for use as an intermediate product for subsequent mixing in to paint and/or varnish formulation and/or for incorporation into a polymer such as melamine formaldehyde polymer.

The nano-crystalline photocatalytic powder used to produce said colloidal suspension may in a preferred embodiment comprise titania or a modified form of titania. Said titania may in particularly comprise the anatase and/or the rutile form of titania. For this application it is important that the crystal morphology i.e. the crystallinity of the photocatalytic particles is substantially maintained as the amorphous phase of titania is photocatalytic inactive. As will become clear from the examples given herein, the crystallinity of such photocatalytic powders and thereby the functionality of said photocatalytic colloidal suspension are easily destroyed by too high stress energy in the milling process. Too high stress energy may cause amorphication of the particles thereby resulting in a significant loss of functionality. To obtain an optically clear suspension it is further imperative that the size of said particles in said colloidal suspension are small. Both these critical issues are solved in a method according to the present invention.

The photocatalyst used to produce said colloidal suspension may further comprise the anatase form of titania doped with one or more elements selected from N, C, S, I, W, Mo, V, Cu, Ag, Au, Pt, Fe, Co, La, Eu, $WO_2$, PdO or combinations thereof. The elements may be present as lattice substitutes and/or as clusters on the surface of said anatase form of titania and/or as a combination of the two. The presence of such elements within and/or on said anatase form of titania changes the properties of said photocatalyst e.g. by changing the band gap energy and/or preventing charge recombination. Thereby the photocatalyst may become more active e.g. be able to utilize visible light (Wavelengths above 400 nm) and/or more active for degradation of organics and/or have improved antimicrobial properties.

The present invention is broadly applicable and has many potential uses including use of a colloidal suspension according to any of the preceding claims as coating fluid to obtain an optically clear photocatalytic coating on the surface of a substrate.

The present invention is applicable in a number of different application areas such as:
Use of a colloidal suspension according to the present invention as an intermediate product;
Use of a colloidal suspension according to the present invention for
Use of a colloidal suspension according to the present invention for outdoor surfaces of a building;
Use of a colloidal suspension according to the present invention for self cleaning- or self sterilizing-surface indoor.

Use of a colloidal suspension according to the present invention in a washing machine, cooker hood, air conditioning system, car, as a volatile organic compound (VOC) reducing agent, odour reducing agent, and/or lamp coating.

Further aspects, embodiments and modifications of the present invention are presented in the drawings, description, examples and claims

BRIEF DESCRIPTION OF FIGURES

FIG. 3 shows a photo of 2 flasks containing colloidal suspensions of exactly the same composition. However, the left transparent flask has been milled whereas the white flask to the right has been sonicated.

FIGS. 4-7 shows various results according to the examples presented herein.

DETAILED DESCRIPTION OF PREFERRED EMBODIMENTS

Figure 1:
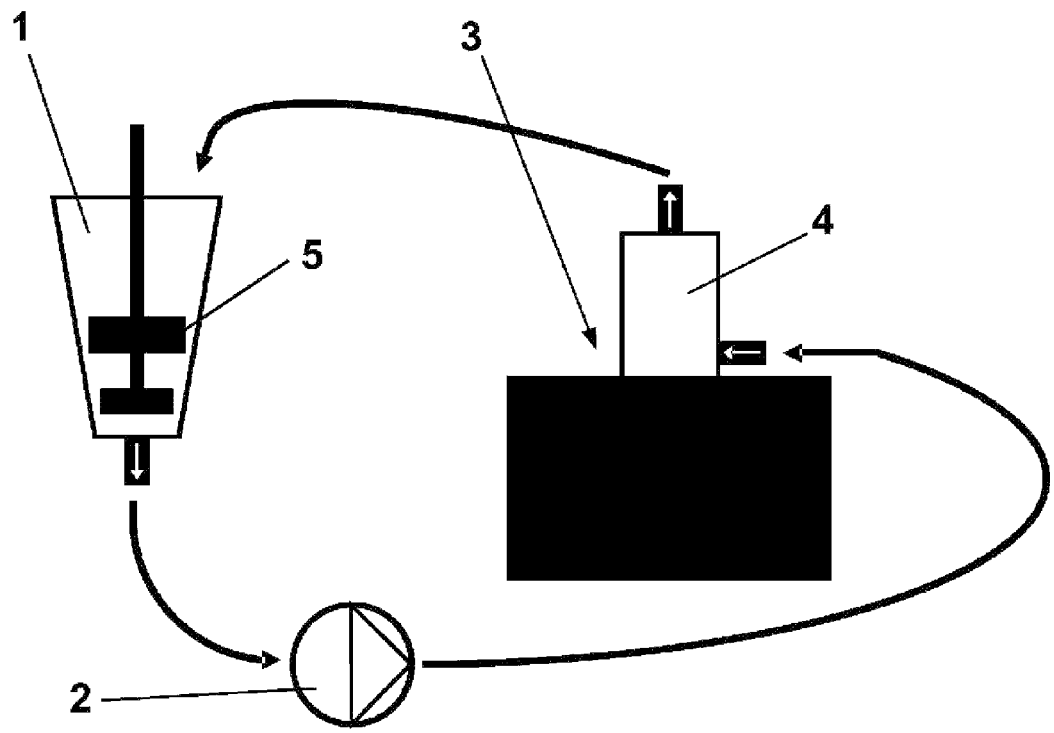
FIG. 1, shows a schematic illustration of an embodiment of a bead mill setup suitable for use according to a method of the present invention, FIG. 2, in a sectional view, shows 3 different of embodiments milling chambers suitable for use in a method of the present invention.

In FIG. 1 a first embodiment of the present invention is schematically shown. A typical setup for producing a colloidal suspension of a nano-crystalline powder in a solvent by milling and dispersing comprises a mixing tank 1, a circulation pump 2 and a bead mill 3. The nano-crystalline powder, the solvent and one or more dispersants are pre-mixed and then poured into the mixing tank 1 or mixed directly in the mixing tank 1, which is fitted with a mechanical stirrer 5. Part of said mixture is pumped by means of a circulation pump 2 into the milling chamber 4 of the bead mill 3. In the milling chamber 4 the mixture is milled before it is transferred back to the mixing tank 1. The mixture is circulated through the milling chamber 4 until the desired colloidal suspension is achieved.

Figure 2:
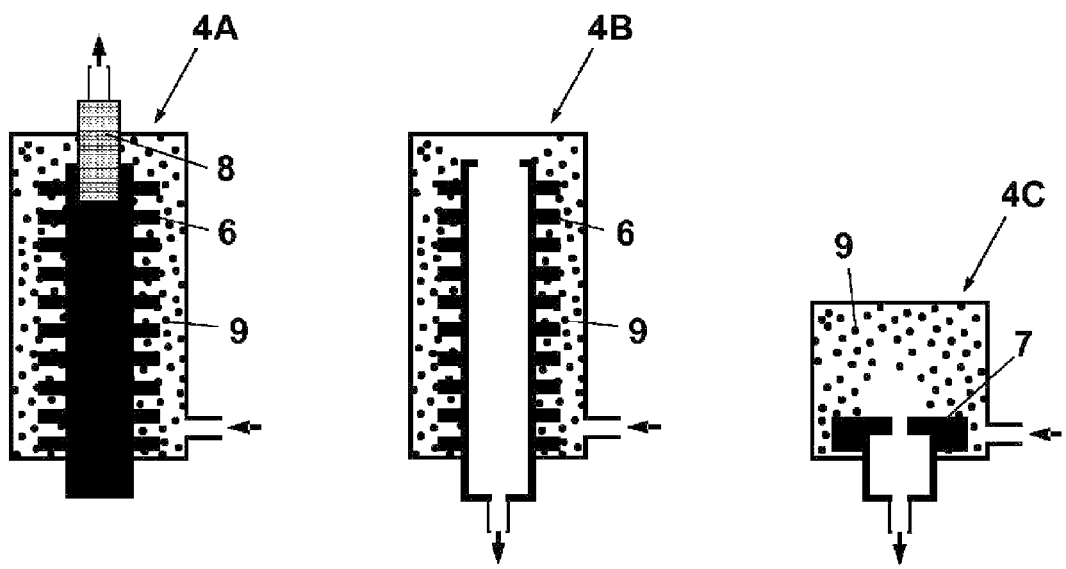

In FIG. 2 a second embodiment of the present invention is schematically shown. The sectional view of 3 different types of milling chambers 4A, 4B, and 4C are shown. Most often, as for milling chamber 4A and 4B, the milling chamber is fitted with an agitator equipped with tips 6, which upon rotation transfer energy to the beads 9 inside the milling chamber. However, in some models as e.g. milling chamber 4C, the beads 9 are agitated by a rotating disc 7. Often, as for milling chamber 4A, the beads are separated from the milled mixture by passing the milled mixture through a screen or filter 8, however some types of milling chambers like 4B and 4C take use of centrifugal forces to separate the beads from the milled mixture. This is often seen when very small beads are used, i.e. beads with an average diameter smaller than 50 μm. One of the values used for scaling from one bead mill to another is the tip speed of the agitator 6, i.e. the tangential speed at the outermost point of the tips. The tip speed is the speed by which the beads 9 are being agitated.

In FIG. 3 a photograph showing a third embodiment of the present invention is presented. A commercial photocatalyst Kronos VLP 7000 (30 wt %), deionised water (50 wt %), propylene glycol (15 wt %) and triethylamine (5 wt %) were mixed in a Silverson L4RT mixer for 30 min at top speed. The resulting slurry was either sonicated 6 h, or milled 6 h as described in Example 3. Subsequently the two colloidal suspensions were diluted to 0.1 wt % using deionized water which prior to mixing had been adjusted to pH 10 by addition of triethylamine. The left flask with the transparent appearance contains the milled colloidal suspension whereas the flask to the right with the white appearance contains the colloidal suspension which has been sonicated.

EXAMPLES

Example 1

Production of a Colloidal Suspension of a Nano-Crystalline Powder in Water

A colloidal suspension was produced by first mixing deionised water (45 wt %), a commercial photocatalyst of anatase, Hombikat UV100, from Sachtleben Chemie GmbH (30 wt %), glycerine (20 wt %) and concentrated aqueous ammonia (5 wt %) in a Silverson L4RT mixer for 10 min at top speed. The resulting slurry was transferred to the mixing tank of a LabStar bead mill (from Netzsch Feinmahltechnik GmbH) equipped with a MiniCer milling chamber and loaded with SiLi beads Type ZY 0.10-0.20 mm in diameter from Sigmund Lindner GmbH. The slurry was milled 18 h with a tip speed of 5.8 m/s affording a near transparent suspension. The average particle size in the suspension (measured by Volume) was 62 nm as determined by Malvern's ZetasizerNano. However, the crystallinity of the particles in the colloidal suspension was measured by X-ray diffraction using calcium fluoride as a 100% crystalline internal reference (H. Jensen, K. D. Joensen, J.-E. Jørgensen, J. S. Pedersen, E. G. Søgaard, *Journal of Nanoparticle Research* 2004, 6, 519-526), and it was found that the crystallinity of the particles had decreased 91% during milling.

Example 2

Production of a Clear Colloidal Suspension of a Nano-Crystalline Powder in Water A clear colloidal suspension was produced by first mixing deionised water (22 wt %), a commercial photocatalyst, Kronos VLP 7000 (40 wt %), glycerine (30 wt %), concentrated aqueous ammonia (4 wt %) and 2-amino-methylpropanol (4 wt %) in a Silverson L4RT mixer for 10 min at top speed. The resulting slurry was transferred to the mixing tank of a LabStar bead mill (from Netzsch Feinmahltechnik GmbH) equipped with a MiniCer milling chamber and loaded with Sigmund-Lindner ceramic beads 0.10-0.20 mm in diameter. The slurry was milled 19 h with a tip speed of 5.8 m/s affording a near transparent brownish dispersion. The average particle size in the dispersion (measured by Volume) was 44 nm as determined by Malvern's ZetasizerNano. However, the crystallinity of the particles in said colloidal suspension had decreased by 88% during milling as determined by X-ray diffraction using calcium fluoride as a 100% crystalline internal reference (H. Jensen, K. D. Joensen, J.-E. Jørgensen, J. S. Pedersen, E. G. Søgaard, *Journal of Nanoparticle Research* 2004, 6, 519-526).

Example 3

Production of a Preferred Clear Colloidal Suspension of a Nano-Crystalline Powder in Water A preferred clear colloidal suspension suitable for use in an embodiment of the present invention was prepared by first mixing commercial photocatalyst Kronos VLP 7000 (30 wt %), deionised water (50 wt %), propylene glycol (15 wt %) and triethylamine (5 wt %) in a Silverson L4RT mixer for 10 min at top speed. The resulting slurry was transferred to a LabStar bead mill (from Netzsch Feinmahltechnik GmbH) equipped with a MicroCer milling chamber and loaded with YTZ® ceramic beads 0.05 mm in diameter (from TOSOH Europe B.V.). The slurry was milled 6 h with a tip speed of 10 m/s affording a clear brownish suspension. The average particle size in the suspension (measured by Volume) was 31 nm as determined by Malvern's ZetasizerNano, and the crystallinity had decreased 33% during the milling process, as determined by X-ray diffraction using calcium fluoride as a 100% crystalline internal reference (H. Jensen, K. D. Joensen, J.-E. Jørgensen, J. S. Pedersen, E. G. Søgaard, *Journal of Nanoparticle Research* 2004, 6, 519-526). After dilution of the clear colloidal suspension to 0.1 wt % following the procedure described in Example 6, the haze was measured to 1.6.

Example 4

Three different colloidal suspensions were produced by different milling processes using the same overall composition of the colloidal suspension:
30 wt % of the commercial photocatalyst Kronos VLP 7000 as nanocrystalline particles,
50 wt % deionized water as solvent, and
15 wt % monopropylene glycol and
5 wt % Triethylamine (TEA) as dispersants.

In the first milling process the mixture was first premixed in a Silverson L4RT for 10 min at top speed and sonicated for 3 hours. The average particles size in suspension was 117 nm (measured by volume) as determined Malvern's ZetasizerNano. The crystallinity was determined to 63% by powder X-Ray Diffraction against a 100% crystalline internal reference (H. Jensen, K. D. Joensen, J.-E. Jørgensen, J. S. Pedersen, E. G. Søgaard, *Journal of Nanoparticle Research* 2004, 6, 519-526). After dilution of the colloidal suspension to 0.1 wt % following the procedure described in Example 6, the haze per cm was measured to 100 (Haze meter in saturation). The colloidal suspension was not transparent.

In the second milling process the composition was first premixed in a Silverson L4RT mixer for 10 min at top speed and the resulting slurry was transferred to a LabStar bead mill (from Netzsch Feinmahltechnik GmbH) equipped with a MiniCer milling chamber and loaded and loaded with Sigmund-Lindner ceramic beads 0.10-0.20 mm in diameter. The slurry was milled 19 h with a tip speed of 10 m/s affording a near transparent brownish dispersion. The average particle size in the dispersion (measured by Volume) was 23 nm as determined by Malvern's ZetasizerNano, and the crystallinity was 13% by powder X-Ray Diffraction against a 100% crystalline internal reference (H. Jensen, K. D. Joensen, J.-E. Jørgensen, J. S. Pedersen, E. G. Søgaard, *Journal of Nanoparticle Research* 2004, 6, 519-526). Hence, more than 79% of the crystallinity was lost during said milling process. After dilution of the colloidal suspension to 0.1 wt % following the procedure described in Example 6, the haze per cm was measured to 1. Therefore colloidal suspension was transparent after dilution.

In the third milling process the composition was first premixed in a Silverson L4RT mixer for 10 min at top speed and the resulting slurry was transferred to a LabStar bead mill (from Netzsch Feinmahltechnik GmbH) equipped with a MiniCer milling chamber and loaded YTZ® ceramic beads 0.05 mm in diameter (from TOSOH Europe B.V.). The volume fraction of said beads in said milling chamber was 80%. The slurry was milled 3 h with a tip speed of 10 m/s affording a clear brownish suspension. The average particle size in the suspension (measured by Volume) was 26 nm as determined by Malvern's ZetasizerNano, and the crystallinity was determined to 62% as determined by X-ray diffraction using calcium fluoride as a 100% crystalline internal reference (H. Jensen, K. D. Joensen, J.-E. Jørgensen, J. S. Pedersen, E. G. Søgaard, *Journal of Nanoparticle Research* 2004, 6, 519-526). Hence, the crystallinity was maintained substantially constant. After dilution of the colloidal suspension to 0.1 wt % following the procedure described in Example 6, the haze per cm was measured to 1.6. Therefore colloidal suspension was substantially transparent after dilution.

The photocatalytic activity was tested by first spin coating the diluted colloidal suspension onto microscope slides, and subsequently spincoating stearic acid on to said microscope slides.

The initial concentration of the stearic acid on the microscope slides was determined by FTIR, and the microscope slides was subsequently irradiated with visible light ($\lambda > 400$ nm) for 24 hours at an intensity of 5 mW/cm$^2$ and the stearic acid concentration on the microscope slides measured again. The photocatalytic degradation in the 3 cases was the following:
Milling process 1: 27%
Milling process 2: 0-2%
Milling process 3: 28%

Example 5

Production of Colloidal Suspension Suitable for Coating of Windows

The clear colloidal suspension from Example 3 (1.4 wt %) was mixed with deionized water which prior to mixing had been adjusted to pH 10 by addition of triethylamine (98.6 wt %). This afforded a substantial transparent colloidal suspension which upon addition of 0.1 wt % BYK 348 from BYK-Chemie GmbH was suitable for coating of windows.

Example 6

Haze Measurements

The haze of colloidal suspensions were measured according to the following procedure: The colloidal suspension was diluted to 0.1 wt % using deionized water which prior to mixing had been adjusted to pH 10 by addition of triethylamine. The haze of passing through 10 mm of said 0.1 wt % colloidal suspension was measured using the Haze-Gard plus apparatus from BYK-Gardner GmbH.

Example 7

Self-Cleaning Effect

The self-cleaning effect of a window coated with the colloidal suspension made in example 5 was investigated according to the definition of self-cleaning effect from the EU project NMP3-CT-2003-505952. The standard procedure for the self-cleaning test is as following:
1) Prepare glass samples 150×150 mm
2) Rinse the glass with DI water.

3) UVA irradiate the samples for 12 hours according to ISO 4892-3 and ISO 4892-1:2000.
4) Haze measurement ($H_{original}$) according to ASTM D 1003.
5) Place the glass sample in the spray machine.
6) Spray the dirt mixture on the glass (definition of dirt mixture and the spray conditions are listed in the EU report).
7) Dry the glass sample vertically at room temperature and for 1 hour at 50° C.
8) Haze measurement ($H_{cycle \times dirt}$).
9) UVA irradiate the sample for 12 hours.
10) Haze measurement ($H_{cycle \times SUN}$).
11) Insert the glass sample in the test rack and spray the DI water (the spray conditions are listed in the EU report).
12) Vertically drying of the sample.
13) Haze measurement ($H_{cycle \times RAIN}$).
14) Repeat steps 3-13.

For each glass slide the haze is measured in five points with symmetry like on a dice, and the self-cleaning effect is calculated for each point:

$$\% \text{ Cleaning Effect} = 100 \times \frac{H_{cycle2dirt} - H_{final}}{H_{cycle2dirt} - H_{original}}$$

Normal float glass has a self-cleaning effect of 25-85%. Thus, to be self-cleaning the value must be >85%.

Six normal float glass samples were cleaned by normal means (soap and water) to remove all dirt and grease. It is important the glass surface has been thoroughly cleaned for best and lasting result. When the glass is dry the pretreatment of the glass surface is started. The pretreatment fluid composition is a 3 wt % $CeO_2$ dispersion in water with a primary particle size of the Ceria nanoparticles of 12 nm determined as the equivalent spherical diameter from BET measurements. The pretreatment fluid composition has a pH of ~3.5 and the median particle size in solution is 150 nm determined by Malvern's ZetasizerNano.

The trigger spray bottle containing the pre-treatment fluid composition is shaken and the pretreatment fluid composition is sprayed over the glass surface—15 ml/m² glass. A microfiber wipe is used to distribute the pretreatment fluid composition across the glass surface and the glass is carefully polished using circular movements with the wipe. The polishing is terminated when the fluid does not contract to droplets and water can spread as a film across the surface.

The pre-treatment fluid composition is washed away from the glass using water. A new microfiber wipe is moistened with water and the glass surface is polished until a fully transparent and clear glass is obtained. If a thin water film is not created when the wipe is moved over the glass the treatment needs to be repeated.

Then the colloidal suspension made in example 5 is applied by a Wagner Fine Coat System spraying the colloidal suspension made in example 5 onto the pre-treated glass samples with approximately 10 ml per m2. The colloidal suspension made in example 5 spread out an create a transparent coating with a Haze of 0.20-0.30. Six glass samples were cured for 2 weeks and pre-activated before testing. The six glass samples were tested for % cleaning effect.

TABLE 2

| Self-cleaning values. | | |
|---|---|---|
| | Reference glass samples | Coated glass samples |
| Cleaning value % | 63.4 ± 5.0 | 99.0 ± 0.8 |

Example 8

Production of a Laminate Board Comprising Photocatalytic Nanoparticles in the Transparent Uppermost Layer The clear colloidal suspension from Example 3 was mixed with melamine formaldehyde resin powder Kauramin Tränkharz 771 from BASF 2:1 (wt/wt). The mixture was stirred until all Kauramin Tränkharz 771 was in solution. The average particle size in the melamine formaldehyde resin dispersion (measured by Volume) was 32 nm as determined by Malvern's ZetasizerNano. A commercially available overlay paper of cellulose (25 g/m²) was impregnated using the melamine formaldehyde resin mixture comprising finely dispersed Kronos VLP 7000 particles, affording an impregnated overlay paper with a density of 98 g/m2 upon drying. A laminate board was produced stacking from the bottom: a melamine formaldehyde resin impregnated balance sheet, a high density fiber board, a melamine formaldehyde resin impregnated décor paper and on top the overlay paper containing melamine formaldehyde resin and nanoparticles. Lamination for 2 min at 150° C. and 60 bar afforded a laminate board with a transparent upper layer containing photocatalytic nanoparticles.

Example 9

Particle Size in Suspension and Crystallinity of the Particles as a Function of Supplied Energy Three different colloidal suspensions were produced by different milling processes using the same overall composition of the colloidal suspension:

30 wt % of the commercial photocatalyst Kronos VLP 7000 as nanocrystalline particles, 50 wt % deionized water as solvent, and 15 wt % monopropylene glycol and 5 wt % Triethylamine (TEA) as dispersants.

The colloidal suspensions were premixed in a Silverson L4RT for 10 min at top speed. Then the resulting slurries were transferred to a LabStar bead mill (from Netzsch Feinmahltechnik GmbH) equipped with a MiniCer milling chamber and loaded with YTZ® ceramic beads 0.05 mm in diameter (from TOSOH Europe B.V.) The slurries were milled with different tip speeds: 3500 rpm, 2500 rpm and 2200 rpm affording a near transparent brownish dispersion. The average particle size in the dispersions (measured by Volume with Nanotrac NPA 252) was measured as a function of energy and tip speed, which is shown in FIG. 4 After dilution of the colloidal suspension to 0.1 wt % following the procedure described in Example 6, the haze per cm was measured as a function of energy and tip speed, which is shown in FIG. 5.

Example 10

Particle Size in Suspension and Crystallinity of the Particles as a Function of Supplied Energy—Different TiO2 Starting Material Three different colloidal suspensions were produced by different milling processes using the same overall composition of the colloidal suspension:
- 30 wt % of a commercial visible light photocatalyst as nanocrystalline particles,
- 50 wt % deionized water as solvent, and
- 15 wt % monopropylene glycol and
- 5 wt % Triethylamine (TEA) as dispersants.

The colloidal suspensions were premixed in a Silverson L4RT for 10 min at top speed. Then the resulting slurries were transferred to a LabStar bead mill (from Netzsch Feinmahltechnik GmbH) loaded with YTZ® ceramic beads 0.05 mm in diameter (from TOSOH Europe B.V.) The slurries were milled with different tip speeds: 3500 rpm and 2500 rpm affording a near transparent brownish dispersion. The average particle size in the dispersions (measured by Volume with Nanotrac Nanotrac NPA 252 was measured as a function of energy and tip speed, which is shown in FIG. 6. After dilution of the colloidal suspension to 0.1 wt % following the procedure described in Example 6, the haze per cm was measured as a function of energy and tip speed, which is shown in FIG. 7.

Example 9 and 10 show that by processing two different commercial TiO2 nanocrystalline particles result in colloidal suspension with different properties. So the optimum milling parameters might be different for different material, even within the same material class.

Example 11

Stability of Suspension as a Function of Time (Particle Properties in Suspension vs. Days/Months)

The properties of a freshly produced colloidal suspension according to example 9 (2500 rpm) and a colloidal suspension produced according to example 9 (2500 rpm) and stored 9 months. The size of the suspensions were determined as the average particle size in the dispersions (measured by Volume with Nanotrac NPA 252) and the Haze was measured after dilution of the colloidal suspension to 0.1 wt % following the procedure described in Example 6, and the haze was measured per cm.

TABLE 3

Properties of Colloidal Suspension.

|  | $D_{vol}$ (average ± STD) [nm] | Haze [—] |
| --- | --- | --- |
| Fresh | 16.84 ± 5.89 nm | 1.5 |
| 9 months | 17.15 ± 6.00 nm | 1.9 |

The invention claimed is:

1. A method of producing a colloidal suspension of nano-crystalline particles in a solvent, the method comprising:
providing a mixture by mixing said nano-crystalline particles with a solvent and one or more dispersants, wherein the one or more dispersants comprises one or more amines, producing a colloidal suspension of said nano-crystalline particles by subjecting the mixture to a milling process in a milling chamber, wherein said mixture is contacted with milling beads,
separating said beads from said colloidal suspension, wherein:
said milling beads in said milling process having a maximum average diameter of 70 μm,
the milling process comprising:
milling said particles in said suspension until the entirety of the particles in suspension have an average size of less than 60 nm, and controlling induced energy to be lower than amorphization energy such that at least 50% of the initial crystallinity of said primary particles is maintained after said milling;
wherein said nano-crystalline particles are photocatalytic particles comprising titania or a modified form of titania.

2. A method according to claim 1, wherein the volume fraction of said milling beads in the milling chamber is in the range 60-95%.

3. A method of producing a colloidal suspension of nano-crystalline particles in a solvent according to claim 1, wherein the total residence time of said mixture in said milling chamber is less than 6 hours.

4. A method of producing a colloidal suspension of nano-crystalline particles in a solvent according to claim 1, further comprising adjusting the pH of said colloidal suspension to values between 9 and 12.

5. A method of producing a colloidal suspension of nano-crystalline particles in a solvent according to claim 1, further comprising adjusting the concentration of said one or more amines in said colloidal suspension to values in the range 0.1-30 wt %.

6. A method of producing a colloidal suspension of nano-crystalline particles in a solvent according to claim 1, wherein said one or more amines comprises triethylamine.

7. A method of producing a colloidal suspension of nano-crystalline particles in a solvent according to claim 1, wherein said one or more dispersants comprises a glycol.

8. A method of producing a colloidal suspension of nano-crystalline particles in a solvent according to claim 7, further comprising adjusting the concentration of said glycol to values in the range 5-40% by weight.

9. A method of producing a colloidal suspension of nano-crystalline particles in a solvent according to claim 1, wherein said solvent is or comprises water and/or one or more alcohols.

10. A method of producing a colloidal suspension of nano-crystalline particles in a solvent according to claim 1, wherein said modified form of titania comprises the anatase form of titania doped with one or more elements selected from N, C, S, I, W, V, Cu, Ag, Au, Pt, Co, Fe, Mo, La, Eu or combinations thereof.

11. A method according to claim 10, wherein said element(s) are present on the surface of said anatase form of titania.

12. A method according to claim 11, wherein the concentration of said element(s) is/are in the range 0.05 to 10% by dry weight of nanocrystalline particles.

13. A method of producing a colloidal suspension of nano-crystalline particles in a solvent according to claim 1, wherein said mixing of said nanocrystalline particles, solvent and one or more dispersants occurs in an agitated chamber.

14. A method of producing a colloidal suspension of nano-crystalline particles in a solvent according to claim 13, the method further comprising:
withdrawing at least part of said mixture from said agitated chamber by means of a circulation pump, and introducing said mixture into a milling chamber comprising said milling beads, and milling and/or grinding and/or dispersing said nano-crystalline particles by creating a rotation of said beads in said milling chamber to obtain a colloidal suspension, separating said beads from said colloidal suspension, and withdrawing and re-circulating at least part of said colloidal suspension from said milling chamber to said agitated chamber.

15. A method of producing a colloidal suspension in a solvent according to claim 14, wherein said separation is performed by centrifugal forces.

16. A method of producing a colloidal suspension in a solvent according to claim 13, wherein the rotational speed of said milling beads is smaller than 15 m/s, wherein the rotational speed of the beads is provided by an agitator.

17. A method according to claim 1, wherein said milling beads are ceramic beads.

18. A method of producing a colloidal suspension of nano-crystalline particles in a solvent, the method comprising:

providing a mixture by mixing said nano-crystalline particles with a solvent and one or more dispersants, wherein the one or more dispersants comprises one or more amines, producing a colloidal suspension of said nano-crystalline particles by subjecting the mixture to a milling process in a milling chamber, wherein said mixture is contacted with milling beads, wherein the volume fraction of said milling beads in the milling chamber is in the range 60-95%, separating said beads from said colloidal suspension, wherein:

said milling beads in said milling process having a maximum average diameter of 70 μm the milling process comprising:

milling said particles in said suspension until the entirety of the particles in suspension have an average size of less than 60 nm, and controlling induced energy to be lower than amorphization energy such that at least 50% of the initial crystallinity of said primary particles is maintained after said milling;

wherein said nano-crystalline particles are photocatalytic particles comprising titania or a modified form of titania.

* * * * *